J. HATCH.
Grain Drill.
RX No. 1. Reissued Jan'y 9, 1838.
9024X Related Doc No
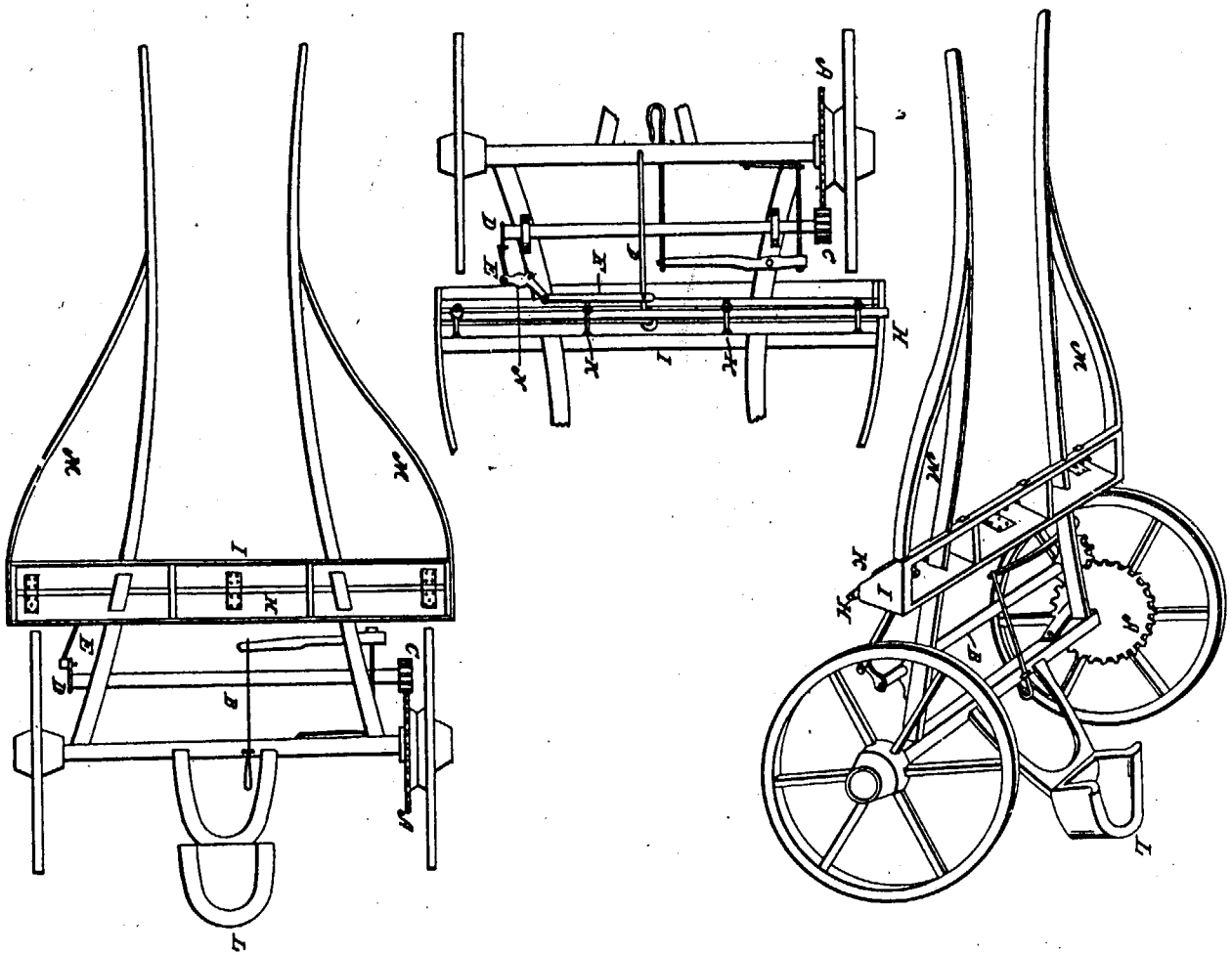
N. PETERS, Photo-Lithographer, Washington, D.C.

Rx1

UNITED STATES PATENT OFFICE.

JULIUS HATCH, OF GREAT BEND, PENNSYLVANIA.

MACHINE FOR SOWING PLASTER, ASHES, SEED, AND OTHER SEPARABLE SUBSTANCES.

902X

Specification forming part of Letters Patent dated August 17, 1835; Reissue No. 1, dated January 9, 1838.

*To all whom it may concern:*

Be it known that I, JULIUS HATCH, of Great Bend, Susquehannah county, State of Pennsylvania, have made an Improvement in the Machine for Sowing Plaster, Lime, Ashes, Seed, Grain, and other Separable Substances, which is described as follows:

This machine consists of two or four wheels, a common axle-tree or axle-trees, and a pair of shafts, for the purpose of moving the machine wherever wanted, a band or cog wheel fastened on the inside of one of the wheels on its hub, a revolving shaft with a pinion or wheel working at one of its ends and a crank at the other, placed under the horse-shafts, a longitudinal rod passing from the crank to an elbow formed of two sides of a right angle placed under one of the horse-shafts, a horizontal rod from the elbow, an arm fastened by a pin on the axle-tree, a sliding rod with its teeth at the bottom of the angular box or hopper, the angular box or hopper itself, its regulating-gages with their screws on which the sliding rod rests, a double apron for preventing the plaster, &c., flying about, the driver's seat, and the fenders on the sides of the shafts. The wheels, the axle-tree, and the horse-shafts for moving the machine or apparatus are of the ordinary construction, as are also the band or cog wheel placed against or fastened to the hub of one of the wheels, and its pinion or wheel and revolving shaft and their position common to various seed-machines. The revolving shaft is placed under the horse-shafts and is parallel to and a suitable distance from the axle-tree and behind the angular box. The first-mentioned rod, connected by a crank at the end of the revolving shaft, runs nearly parallel to one of the horse-shafts. The elbow is formed of two sides, producing a right angle. The horizontal rod, connected with the inside arm of the elbow, runs to the vibrating arm. This arm is fastened at one end by a pin or screw to the axle-tree, which is its fulcrum. Its other end is secured by a staple or otherwise, and is fastened about the center of the sliding rod or agitator. Said vibrating arm may be dispensed with and the agitator vibrated by the connecting-rod being attached immediately to the agitator or in any other similar mode known to mechanics. The angular box or hopper for the reception of the plaster, &c., is formed of two sides, about twelve inches deep each, and are about fourteen inches apart at top. They are confined at their ends by angular pieces of wood and at suitable distances. Inside are angular pieces running partly down toward the bottom of the sides, not only to strengthen the box, but to permit the plaster, &c., to pass underneath them. The passage between the two sides of the angular box is regulated by the screws to suit the nature of the matter to be distributed. The box may have a cover for protection from the weather. It is suspended by the shafts in front of the driving-wheels. The sliding rod or agitator is placed beneath the sides of the box, leaving a space of one-fourth of an inch between the upper side of the agitator and the bottom of the hopper for the passage of the substance to be sown, and has teeth at suitable distances apart to agitate the plaster, &c., in the hopper to cause it to be discharged regularly. The regulating-gages are fastened by screws to the side of the box, and a screw to the ends of every couple of gages placed at suitable distances apart the whole length of the box, said gages being for the purpose of increasing or lessening the space at the lower sides of the box. The double apron for preventing the flying off of the plaster, &c., is suspended from the lower sides of the box to within a suitable distance of the ground. In some cases the apron may be dispensed with. The driver's seat is placed on inclined arms fastened on the upper side of the axle-tree, running back to preserve the equilibrium of the machine and for the driver's convenience. The fenders are bent pieces of wood, which are fastened about the middle of the outer part of each shaft, and run to each end of the box or hopper, and their object is to protect the hopper from injury. This arrangement for a cart-fixture can be adapted to a wagon when the invention is wanted for extensive operations. By mixing clover or timothy seed with plaster, lime, ashes, or earth the seed may be spread in a proper manner. The agitators may also be vibrated by an eccentric operation.

Operation: The horse or moving power being applied to the shafts and set in motion, the supporting-wheels revolve upon the ground, one of which turns the cog or band wheel, secured thereto by pins or screws. This band or cog wheel turns the pinion or whirl, which is fastened securely at one end of the revolving axle. As the axle revolves it turns the crank at its end, which moves the crank-rod and the elbows, which communicate the motion to the arm or agitating-rod by the intervention of the connecting-rod. The arm or connecting-rod being secured to the sliding rod, an agitator moves it to and fro horizontally, which agitating the plaster, seed, &c., suffers it to pass between the agitator and the bottom of the hopper, and fall to the ground regularly and evenly.

The invention claimed by me, the said JULIUS HATCH, and which I desire to secure by Letters Patent, consists in—

1. The combination of the slide or agitator and hopper, as before described, for agitating the substance in the same to be sown, so as to cause it to pass from the hopper regularly and evenly, whether constructed in the manner before described, and vibrated by means of the above combination of wheels, cog-wheels, axle, crank-rod, elbow, and arm, or in any other mode substantially the same.

2. The gages for regulating the before-described swinging parts of the hopper, whether constructed as herein set forth or in any other manner substantially the same in principle.

Great Bend, December 18, 1837.

JULIUS HATCH.

Witnesses:

THOS. WILLIAMS,
SABIN HATCH.